United States Patent
Bell

[11] Patent Number: 5,184,174
[45] Date of Patent: Feb. 2, 1993

[54] PHOTOGRAPHIC SYSTEM WITH OFF-THE-FILM EXPOSURE METERING

[75] Inventor: Cynthia S. Bell, Webster, N.Y.

[73] Assignee: Eastman Kodak Company, Rochester, N.Y.

[21] Appl. No.: 794,290

[22] Filed: Nov. 19, 1991

[51] Int. Cl.[5] .................... G03B 7/099; G03B 7/24; G03C 5/00

[52] U.S. Cl. .................................... 354/480; 354/21; 354/105; 430/30

[58] Field of Search ............... 354/21, 20, 105, 106, 354/431, 480; 430/30; 356/443, 444; 250/559

[56] References Cited

U.S. PATENT DOCUMENTS

| | | | |
|---|---|---|---|
| 3,687,026 | 8/1972 | Kobayashi et al. | 354/480 |
| 3,730,063 | 5/1973 | Kobayashi et al. | 354/431 |
| 4,173,401 | 11/1979 | Harvey | 354/21 |
| 4,295,720 | 10/1981 | Mizokami et al. | 354/51 |
| 4,349,272 | 9/1982 | Holthusen | 354/21 |
| 4,437,742 | 3/1984 | Taniguchi | 354/21 |
| 4,598,986 | 7/1986 | Shiratori et al. | 354/21 |
| 4,685,786 | 8/1987 | Iida et al. | 354/21 |
| 4,736,215 | 4/1988 | Huospeth et al. | 354/21 |
| 4,974,096 | 11/1990 | Wash | 354/21 X |

Primary Examiner—W. B. Perkey
Attorney, Agent, or Firm—Francis H. Boos, Jr.

[57] ABSTRACT

Off-the-film metering in a photographic film camera is improved by measuring actual film reflectivity at the time of film manufacture and recording a film adjusted exposure constant on a magnetic recording layer on the film. Camera apparatus is provided to read this film adjusted exposure constant value and generate an adjustable reference level representative of actual film reflectivity which is then used in confunction off-the-film metering apparatus to control exposure of the film in accordance with actual film reflectivity values rather than a fixed or assumed value. Measured film exposure aim may also be recorded at film production and used to control film exposure in the camera.

6 Claims, 2 Drawing Sheets

PHOTOGRAPHIC SYSTEM WITH OFF-THE-FILM EXPOSURE METERING

FIELD OF INVENTION

This invention relates to a photographic system with improved "off-the-film" metering for exposure control in a camera.

BACKGROUND

The use in photographic cameras of built-in light meter devices, such as photodiodes and associated control circuits, for metering the illumination both before and during actual exposure of the film is well known. Such automatic exposure meters in non single lens reflex camera usually employ an imaging path separate from the taking lens path. In the case of single lens reflex cameras having interchangeable lenses, gauging of the proper exposure for film becomes a problem if separate light paths are used since lenses do not all have the same transmissivity characteristic. As a consequence, it is preferable that exposure meters for cameras with interchangeable lenses employ the same light path as used to expose the film, that is, to measure the incoming light through the taking lens. Such meter arrangements are also advantageous because of the ability to determine accurately the amount of incoming light for proper exposure of the film during a flash picture and to quench the flash when proper exposure has been achieved.

The use of so-called off-the-film (OTF) light metering in cameras is well known. In OTF metering, the light from an object being photographed is typically reflected by the camera shutter curtain which has been printed with a patterned material to resemble the reflectivity of film. The exposure control circuit measures the light reflected from the curtain and then proceeds to determine the proper exposure period. Upon initiating the film exposure, the circuit measures the light reflecting from the surface of the film and employs the shutter curtain measurement to correct the film reflectivity variable. An example of such a technique is found in U.S. Pat. No. 4,295,720 which describes an improved circuit that measures the light from a plain black curtain. A modification of this approach is described in U.S. Pat. No. 4,685,786 wherein one of two film reflection coefficients is selected by inferring whether the film is for slides or prints based on film latitude information DX encoded on the film cartridge. While useful as attempts to provide OTF metering, such techniques are significantly limited in accuracy by the variability that exists in the reflectance and scattering properties of different films. The film surface reflection is more variable than these prior art techniques can compensate.

As is known in the photographic art, the process of film manufacturing involves making emulsion and sensitizing them in batches. In the case of color film, the emulsion is sensitized to obtain the desired spectral sensitivity for each color absorption layer. After an emulsion batch is sensitized, a small coating sample is made for film characterization. Each batch is analyzed and then appropriate sensitivity adjustment coatings are specified to keep the speed of the respective color layers in balance. For example, if the green layer is a bit slow, the red and blue layers are filtered to reduce sensitivity so that the film maintains proper overall color balance. The various thicknesses of the resulting coatings interact with the impinging light (by wavelength) and affect the surface reflectance of the film, batch to batch. This variation occurs in addition to an already large film surface reflectance variability across film types. It is desirable, therefore, that calibration of exposure with OTF exposure control at the time of picture-taking be based on actual film characteristics and that exposure based on shutter curtain readings or inferred film characteristics be avoided.

It is also known in the photographic art that the rated ISO of a film corresponds to the exposure yielding first acceptable images. A common practice among experienced photographers is to adjust the ISO so as to further optimize film characteristics. For example, consumer negative film colors can become more saturated when the film is exposed at an ISO slower than the rated ISO. Similarly, slide film colors are more saturated when the film is exposed at an ISO faster than the rated ISO. The amount and direction of exposure bias selected is determined by the photographer based on testing a roll from his block of film, combined with his prior experience. Inexperienced or low volume film users do not benefit from this capability. If an exposure aim for optimal image quality was determined at film manufacturing and provided for all photographers, it would save experienced photographers time spent characterizing each batch and would also allow camera having intelligent exposure control to selectively utilize the aim to provide inexperienced users with higher quality images.

SUMMARY OF THE INVENTION

In one aspect of the present invention, a method of producing photographic film is provided wherein the film is of the type having a transparent base layer, a coating of one or more photosensitive emulsion layers and a layer of magnetic recording material. In particular, the film production method comprises measuring surface reflectivity of the film with the emulsion coating in place, generating a film exposure constant adjusted for the measured surface reflectivity and magnetically recording, on the film magnetic layer, encoded data representing the surface reflectivity adjusted film exposure constant. In a further aspect of the invention, the film production method includes measuring the exposure aim value of the emulsion coating and recording, on the film magnetic layer, data representing the measured exposure aim value.

Further according to the invention, camera apparatus is provided which is adapted to receive photographic film of the type having a layer of magnetic recording material with encoded data recorded thereon including data which represents a film exposure constant adjusted for actual film surface reflectivity measured during the film production process. The camera apparatus comprises magnetic read means for reading data from the magnetic layer means and for generating a first signal representative of said film surface reflectivity adjusted exposure constant. The camera apparatus further comprises optical sensor means responsive to light reflected from the film surface for generating a second signal representative of light admitted along a taking lens path onto the film in the process of taking a picture and exposure control means responsive to the first and second signals for controlling exposure of the film based on the amount of light admitted along the taking lens path with adjustment for actual reflectivity of the film in the camera.

DETAILED DESCRIPTION

Figure 1:
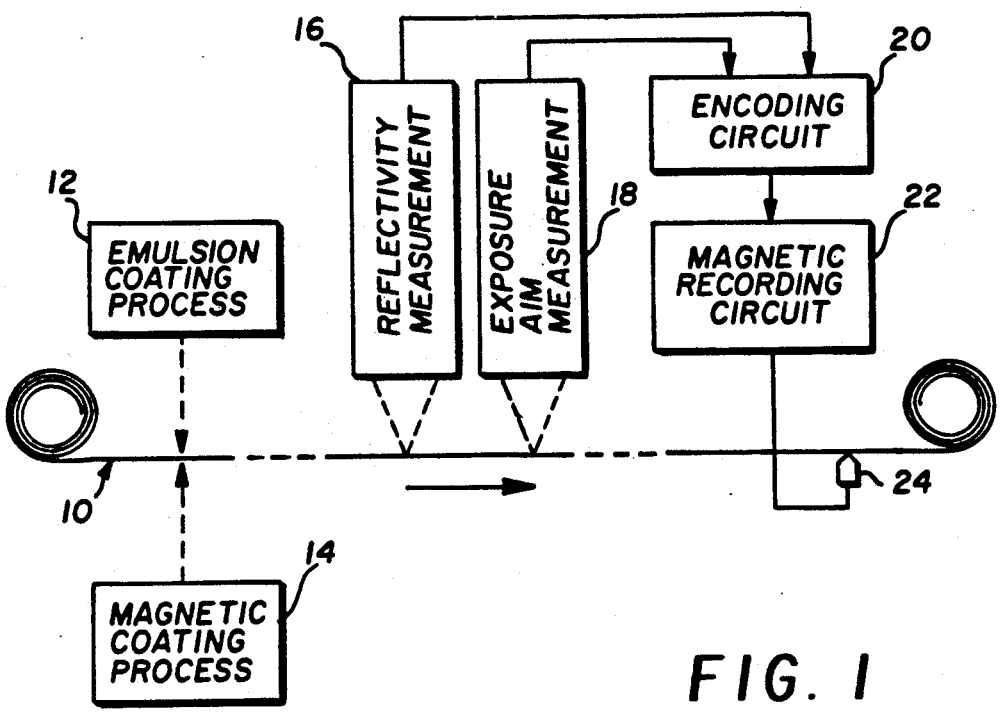
FIG. 1 is a schematic diagram of a film manufacturing operation embodying one aspect of the present invention.
Figure 2:
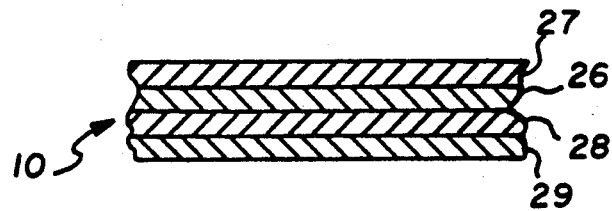
FIG. 2 is a cross section diagram of photographic film bearing a magnetic recording layer useful in the present invention.

FIG. 1 schematically illustrates segments of a film production process relevant to one aspect of the present invention. An elongated film strip 10 is passed through an emulsion coating process 12 in which a coating of one or more photosensitive emulsion layers is applied to one side of the film strip. A magnetic coating process 14 applies a layer of magnetic recording material to the other side. The details of the coating processes are well known in the art and need not be repeated here. The result is a film strip as shown in cross section in FIG. 2 which includes a base 26, various well known photochemical emulsion layers 27 on one side of the base and a magnetic layer 28 on the other. An anti-static and lubricating layer 29 preferably overlies the magnetic layer 28. Although the magnetic coating may cover the entire surface of the film base 26, in which case the coating would be a virtually transparent coating, the magnetic coating 28, for the purposes of the invention, may be coated only along an edge of the film strip or only in the leader portion of the strip, in which case the coating need not be transparent.

As previously described, the emulsion coating process is a complex process that can result in film batches with significantly different film reflectance coefficients dependent, for example, on the need to achieve proper color balance based on the characteristics of the particular emulsion batches employed in the coating process. In accordance with an aspect of the present invention, the emulsion coated surface of film 10 is subjected to a reflectivity measurement step 16 to determine the exposure constant for the particular film involved. Optionally, according to another aspect of the invention, the film may also undergo an exposure aim value measurement step 18. The data derived from measurement steps 16 and 18 are then converted to a suitable digital signal format in encoding circuits 20 and magnetically recorded by means of recording circuit 22 and magnetic recording head 24 onto the layer of magnetic recording material 28. This recorded data thus uniquely characterizes the particular film according to its reflectivity and, optionally, an exposure aim value desired for optimal picture taking.

Figure 3:
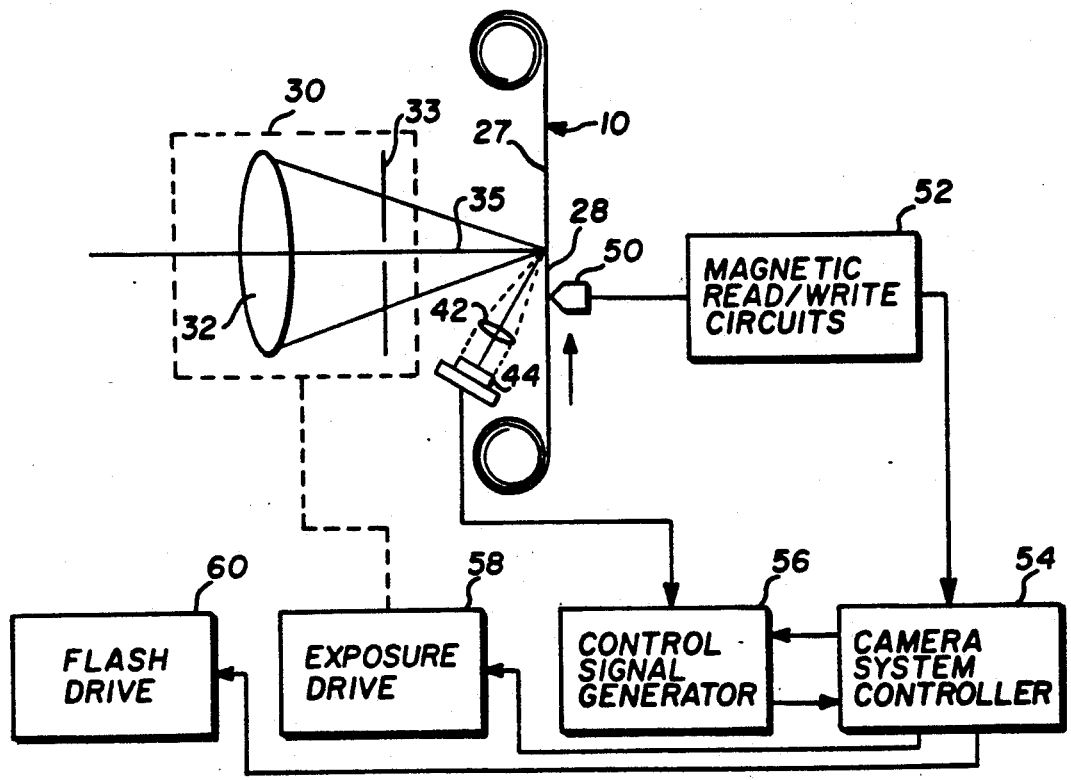
FIG. 3 is a partly schematic block diagram of portions of camera embodying aspects of the present invention.

Referring to FIG. 3, there is shown camera apparatus adapted to receive photographic film 10 of the type just described as having data recorded thereon representative of a film exposure constant adjusted for actual film surface reflectivity measured during the film production process and, optionally, an exposure aim value similarly measured during the film production process. The camera apparatus includes film image exposure means 30 including taking lens 32 and aperture shutter mechanism 33 controlled in a generally known manner by an exposure controller 58 to achieve desired focus and exposure conditions on film 10. A portion of the scene light admitted along taking lens path 35 is reflected from the emulsion surface 27 of film 10 through a focusing lens 42 onto an optical sensor means comprised of a photodiode 44 for generating a signal representative of the admitted scene light which is applied to one input of a control signal generator 56.

The camera apparatus is further provided with a magnetic read/write head 50 to read the encoded data magnetically recorded on magnetic layer 28 of film 10 and with magnetic read/write circuits 52 operative to generate from the read data various signals applied to camera system controller 54 to be used in controlling camera operations. Typically such signals are applied in digital form to system controller 54 and converted to analog form by a digital-to-analog (D/A) converter in the controller for use in performing camera control operations. Included in such signals is a first signal representative of the film surface reflectivity exposure constant recorded on the film during film production which, after conversion to analog form is applied to another input of control signal generator 56. Control signal generator 56, to be described in more detail subsequently, is functionally operative to compare light admitted to the camera along taking lens path 35 to an adjustable reference level established in generator 56 according to the surface reflectivity adjusted film exposure constant received from system controller to establish a film exposure control variable which is adjusted for actual reflectivity of film in the camera. Typically, this variable is used in controller 54 to set up a timing interval which may then be used in known manner, in conjunction with exposure drive 58, to establish the duration of exposure of the film. The output of comparator 80 may also be used with flash drive 60 to control the duration of a flash exposure period.

Figure 4:
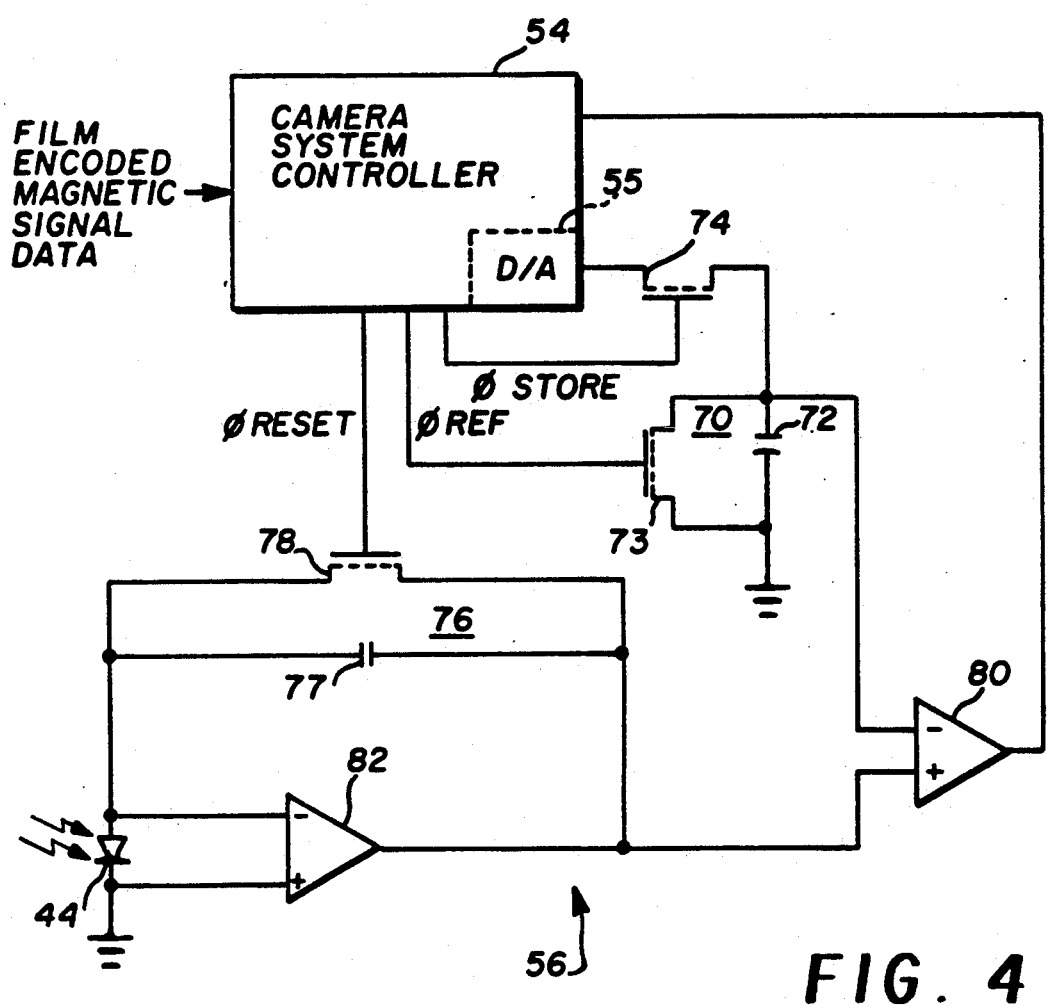
FIG. 4 a schematic circuit diagram of a circuit useful in the camera of FIG. 3.

Referring to FIG. 4, there is shown an example of control circuit 56 useful in controlling the exposure onto the film according to the invention. Control signal generator 56 includes a timer control circuit 76 and op amp 82 coupled to the output of photodiode 44. Circuit 76 is comprised of a charge capacitor 77 and a reset FET switch 78 controlled by a timing signal $\phi_{reset}$ from system controller 54. The output of circuit 76 is coupled to one input of a comparator circuit 80.

According to a feature of the invention, an adjustable reference level setting circuit 70, including charge capacitor 72 and reset FET switch 73, is included in circuit 56 and has its ungrounded side connected in common to a digital-to-analog converter circuit 55 in system controller 54 via a FET switch 74 and to a second input of comparator 80. The output of comparator 80 is preferably used to terminate the counting operation of an internal timer included in system controller 54 to control exposure drive 58, in known manner, to determine the amount of exposure on film 10 and, if appropriate, the cessation of flash drive 60.

In the operation of the control signal generator circuit 56, the decoded digital signals from magnetic read/write circuits 52 are provided to system controller 54 where they are converted to analog form and used to control various operating conditions of the camera. At an appropriate time, system controller 54 discharges reference level setting capacitor 72 by sending a discharge timing signal $\phi_{ref}$ to close and then open FET switch 73. Controller 54 then closes and opens FET switch 74 by means of a timing signal $\phi_{store}$ which causes the analog signal representing the film reflectance adjustment factor to charge reference level capacitor 72 to the corresponding analog reference voltage value. This value may also include an adjustment factor for the exposure aim value recorded on the film. The exposure control circuit is now calibrated to the particular film in the camera as determined by the digitally encoded information recorded on the film. Now, when an exposure determination is needed, as for example at the beginning of taking a picture, controller 54 sends a reset signal $\phi_{reset}$ to FET switch 78 to discharge exposure time integrating capacitor 77. Controller 54 also initializes an internal counter and counts the time interval between initiating the measurement and receiving a completion signal from the output of comparator 80. The light impinging on the photodiode 44 is integrated on the integrating capacitor 77 in well known manner by op amp 82. The integrating charge level of capacitor 77 is compared to the voltage level established on level setting capacitor 72 and when the two levels are equal, the comparator 80 changes state, signalling controller 54 to halt the counting interval. The time interval is then used in conventional manner by system controller 54 to perform pre-exposure, exposure, and flash timing control.

The invention has been described in detail with particular reference to a presently preferred embodiment, but it will be understood that variations and modifications can be effected within the true spirit and scope of the invention.

What is claimed is:

1. A method of producing photographic film of the type having a transparent base layer, a coating of one or more photosensitive emulsion layers and a layer of magnetic recording material, the method comprising:
   measuring surface reflectivity of the film with the emulsion coating in place;
   generating a film exposure constant adjusted for said measured surface reflectivity
   and magnetically recording on the film magnetic layer encoded data representing the surface reflectivity adjusted film exposure constant.

2. The method of claim 1 including measuring the exposure aim value of the emulsion coating and recording on the film magnetic layer data representing the measured exposure aim value.

3. An elongate photographic film strip comprising:
   a magnetic recording area; and
   at least one field recorded on said magnetic area, said field including encoded data representing a surface reflectivity adjusted film exposure constant measured for said film strip at the time of film production.

4. An elongate film strip according to claim 3 wherein at least recorded field on said magnetic area includes encoded data representing an exposure aim value measured for said film strip at the time of film production.

5. Camera apparatus adapted to receive photographic film of the type have a layer of magnetic recording material having encoded data recorded thereon during film production process including data representative of a film exposure constant adjusted for actual film surface reflectivity measured during the film production process, the camera apparatus comprising:
   magnetic read means for reading said encoded film exposure constant data from said magnetic layer;
   means for generating a first signal representative of said film adjusted exposure constant;
   optical sensor means responsive to light reflected from said film surface for generating a second signal representative of light admitted along a taking lens path onto said film;
   exposure control means responsive to said first and second signals for establishing a film exposure adjusted for actual reflectivity of film in said camera apparatus.

6. Camera apparatus according to claim 5 wherein said encoded data on the film includes data representative of film exposure aim recorded during production and said first signal includes a signal representative of said measured film exposure aim and said exposure control means establishes film exposure adjusted for actual film reflectivity and/or said measured film exposure aim.

* * * * *